(12) United States Patent
Xu et al.

(10) Patent No.: US 11,982,556 B2
(45) Date of Patent: May 14, 2024

(54) WET GAS FLOW RATE METERING METHOD BASED ON A CORIOLIS MASS FLOWMETER AND DEVICE THEREOF

(71) Applicant: SEA PIONEERS TECHNOLOGIES CO., LTD., Jiangsu (CN)

(72) Inventors: Bin Xu, Jiangsu (CN); Jige Chen, Jiangsu (CN)

(73) Assignee: SEA PIONEERS TECHNOLOGIES CO., LTD., Jiangsu (CN)

( * ) Notice: Subject to any disclaimer, the term of this patent is extended or adjusted under 35 U.S.C. 154(b) by 359 days.

(21) Appl. No.: 17/499,875

(22) Filed: Oct. 13, 2021

(65) Prior Publication Data

US 2022/0034697 A1 Feb. 3, 2022

Related U.S. Application Data

(63) Continuation of application No. PCT/CN2019/102097, filed on Aug. 22, 2019.

(51) Int. Cl.
*G01F 1/84* (2006.01)
*G01K 13/024* (2021.01)

(52) U.S. Cl.
CPC .......... *G01F 1/8409* (2013.01); *G01F 1/8468* (2013.01); *G01K 13/024* (2021.01)

(58) Field of Classification Search
CPC .............................. G01F 1/8409; G01F 1/8468
See application file for complete search history.

(56) References Cited

FOREIGN PATENT DOCUMENTS

| CN | 102346058 | 2/2012 |
|----|-----------|--------|
| CN | 110726444 | 1/2020 |

OTHER PUBLICATIONS

Wang et al., Model Method of Coriolis Mass Flow Meter Measuring Gas Liquid Flow Rate, Feb. 2012, FIT Computer Translation (Year: 2012).*

(Continued)

*Primary Examiner* — Erika J. Villaluna
(74) *Attorney, Agent, or Firm* — Cooper Legal Group, LLC

(57) ABSTRACT

This application discloses a wet gas flow rate metering method and device thereof. The Coriolis mass flowmeter measures a total mass flow rate $Q_m$, a mixed density $\rho_{mix}$, and a medium temperature T; a combination of sensors measures a differential pressure $\Delta P$ between an inlet and an outlet; a flow rate calculation module performs multi-physical field coupling calculation to obtain an average gas density $\rho_g$; according to the mixed density $\rho_{mix}$, the average gas density $\rho_g$, and a liquid density $\rho_l$, a mass liquid content $\eta_m$ of a mixed medium is calculated, and the total mass flow rate $Q_m$ is corrected by the mass liquid content $\eta_m$, the medium temperature T and the average pressure P to obtain a corrected total mass flow rate $Q_m'$. According to the total mass flow rate $Q_m'$ and the mass liquid content $\eta_m$, a two-phase flow rate is calculated.

15 Claims, 5 Drawing Sheets

(56) References Cited

OTHER PUBLICATIONS

"International Search Report (Form PCT/ISA/210) of PCT/CN2019/102097", dated May 19, 2020, with English translation thereof, pp. 1-6.
"Written Opinion of the International Searching Authority (Form PCT/ISA/237) of PCT/ CN2019/102097", dated May 19, 2020, pp. 1-4.

* cited by examiner

| standard gas flow rate (Kg/h) | standard liquid flow rate (Kg/h) | standard total flow rate (Kg/h) | Coriolis flow Indication (Kg/h) | corrected total flow Rate (Kg/h) | mass gas Content (GMF) | total flow rate error before Correction | total flow rate error after correction |
|---|---|---|---|---|---|---|---|
| 1717.76 | 58.43 | 1776.20 | 2092.50 | 1800.21 | 97% | 17.80% | 1.35% |
| 1678.47 | 362.54 | 2041.01 | 3116.34 | 1995.86 | 82% | 52.70% | -2.21% |
| 1627.92 | 773.80 | 2401.72 | 5303.64 | 2413.83 | 68% | 120.80% | 0.50% |
| 1589.02 | 948.47 | 2537.49 | 5953.76 | 2543.79 | 63% | 135.80% | 0.25% |
| 1611.59 | 445.37 | 2056.96 | 3472.93 | 2064 | 79% | 68.80% | 0.34% |

US 11,982,556 B2

WET GAS FLOW RATE METERING METHOD BASED ON A CORIOLIS MASS FLOWMETER AND DEVICE THEREOF

CROSS-REFERENCE TO RELATED APPLICATION

This application is a continuation of international application of PCT application No. PCT/CN2019/102097 filed on Aug. 22, 2019. The entirety of the above-mentioned patent application is hereby incorporated by reference herein and made a part of this specification.

BACKGROUND

Technical Field

The present application relates to the technical field of wet gas flowmeters, and for details, to a wet gas flow rate metering method based on a Coriolis mass flowmeter and a device thereof.

Description of Related Art

In the natural gas exploitation process, a small amount of liquid substances are often accompanied, and due to the existence of the liquid substances, the traditional gas flow metering device cannot work normally or has serious deviation, so that the metering problem of the gas containing liquid becomes a problem which is urgently needed to be solved in the oil and gas industry.

In a scene containing a gas-liquid two-phase medium, a considerable proportion of the medium is the case where the liquid content is very low and the liquid state is relatively stable. Generally, the medium with the liquid content below 5% in volume is classified as wet gas. Compared with a multiphase flow in a wide sense, the flow shape and the flow state of the wet gas are relatively simple, and its components are gas-liquid two phases.

The Coriolis mass flowmeter not only can measure a mass flow rate of a medium, but also can measure a density and a temperature of the medium. The Coriolis mass flowmeter can be used for measuring the wet gas flow rate by utilizing the capabilities of the Coriolis mass flowmeter and measuring other physical quantities. The existing device for trying to measure the wet gas by utilizing the Coriolis mass flowmeter is to connect the Coriolis mass flowmeter with an orifice plate flowmeter (or a similar flowmeter) in series, and the flow rate of a gas-liquid two-phase medium is obtained by a special data processing of the data of the two flowmeters so as to achieve the purpose of measuring the two-phase flow rate. However, the method has the problems that the two flowmeters have different measurement positions and different working conditions, the main component of the medium is gas, the pressure and the temperature are different along with the flow resistance, the measurement of the two positions cannot be simply corresponded, and in view of physical principle, the upstream and downstream relation can be corrected by some models to achieve the purpose. However, such measurement is not direct, and would also bring about corresponding uncertainty.

SUMMARY

In view of the defects in the prior art, a first object of the present application is to provide a wet gas flow rate metering method based on a Coriolis mass flowmeter, which uses a single Coriolis mass flowmeter for data measurement and combines a multi-physical field coupling calculation, so that the obtained gas-liquid two-phase data has higher accuracy.

In order to achieve the purpose, the present application provides the following technical solution: a wet gas flow rate metering method based on a Coriolis mass flowmeter, including the steps of:

measuring, by a Coriolis mass flowmeter, a mass flow rate $Q_m$, a mixed density $\rho_{mix}$, a medium temperature T in a pipe;

measuring, by a combination of sensors, pressure P at the inlet and the outlet of the Coriolis mass flowmeter;

performing, by a flow rate calculation module, a multi-physical field coupling calculation, calculating pressure P corresponding to different positions X in a measuring pipe of the Coriolis mass flowmeter, and generating a function curve between the position and the pressure;

calculating, by the flow rate calculation module, an average pressure P in the measuring pipe of the Coriolis mass flowmeter through the function curve;

calculating, by the flow rate calculation module, an average gas density $\rho_g$ according to the average pressure P;

calculating, by the flow rate calculation module, a mass liquid content $\eta_m$ of a mixed medium according to the mixed density $\rho_{mix}$, the average gas density $\rho_g$ and a liquid density $\rho_l$ (a constant);

correcting, by the flow rate calculation module, the total mass flow rate $Q_m$ according to the mass liquid content $\eta_m$, the average pressure P in the measuring pipe and the medium temperature T to obtain a total mass flow rate $Q_m'$;

calculating, by the flow rate calculation module, a gas mass flow rate $Q_g$ and a liquid mass flow rate $Q_l$ according to the mass liquid content $\eta_m$ and the total mass flow rate $Q_m'$.

The second objective of the present application is to provide a wet gas flow rate metering device based on a Coriolis mass flowmeter, including a Coriolis mass flowmeter, and further including a pipe, a flow rate calculation module and a combination of sensors that is mounted on the pipe, in which:

the pipe is for transferring the wet gas;

the combination of sensors is for measuring a differential pressure ΔP at the inlet and the outlet in the pipe;

the flow rate calculation module performs a multi-physical field coupling calculation, calculates pressure P corresponding to different positions X in a measuring pipe of the Coriolis mass flowmeter, and generates a function curve between the position and the pressure; the flow rate calculation module calculates an average pressure P in the measuring pipe of the Coriolis mass flowmeter through the function curve; calculates an average gas density $\rho_g$ according to the average pressure P; then calculates a mass liquid content $\eta_m$ of a mixed medium according to the mixed density $\rho_{mix}$, the average gas density $\rho_g$ and a liquid density $\rho_l$ (a constant); the flow rate calculation module corrects the total mass flow rate $Q_m$ according to the mass liquid content $\eta_m$, the average pressure P in the measuring pipe and the medium temperature T to obtain a total mass flow rate $Q_m'$; finally, the flow rate calculation module calculates a gas mass flow rate $Q_g$ and a liquid mass flow rate $Q_l$ according to the mass liquid content $\eta_m$ and the total mass flow rate $Q_m'$.

It is further provided that the combination of sensors includes a pressure sensor and a differential pressure sensor that by measuring the pressure at the inlet of the Coriolis mass flowmeter and measuring the differential pressure ΔP at the inlet and the outlet in combination with the mixed density $\rho_{mix}$, obtain the average pressure in the measuring pipe of the Coriolis mass flowmeter through a computational fluid dynamics CFD model.

It is further provided that the combination of sensors includes two pressure sensors that by measuring the pressure at the inlet and the outlet of the Coriolis mass flowmeter to obtain an actual differential pressure ΔP in combination with the mixed density $\rho_{mix}$, obtain the average pressure in the measuring pipe of the Coriolis mass flowmeter through a computational fluid dynamics CFD model.

It is further provided that the step that the flow rate calculation module calculates an average pressure P in the measuring pipe of the Coriolis mass flowmeter through the function curve includes:

calculating by using a calculus area solving to obtain the average pressure P.

It is further provided that the flow rate calculation module, according to the pressure and the temperature in combination with a PVT equation of a gas phase medium, uses a formula:

$$\frac{\rho_g}{\rho_0} = \frac{P}{P_0} * \frac{T_0}{T}$$

to finally obtain the average gas density $\rho_g$;

and calculates the gas density $\rho_g$, where P, T are the pressure and the absolute temperature in the measuring pipe of the Coriolis mass flowmeter respectively, $\rho_0$, $P_0$ and $T_0$ are the gas density, the pressure and the absolute temperature in a calibration state respectively.

It is further provided that the flow rate calculation module uses the formula:

$$\eta_m = \frac{\rho_{mix} - \rho_g}{\rho_l - \rho_g} * \frac{\rho_l}{\rho_{mix}};$$

to calculate a mass liquid content $\eta_m$ of a mixed medium, where $\rho_{mix}$ is the mixed density, $\rho_g$ is the average gas density, and $\rho_l$ is a liquid density.

It is further provided that the flow rate calculation module corrects the total mass flow rate $Q_m$ according to the mass liquid content $\eta_m$, the average pressure P in the measuring pipe and the medium temperature T to obtain a total mass flow rate $Q_m'$, and the specific correction formula is that $Q_m'=f(P,T,\eta_m,Q_m)$.

It is further provided that the flow rate calculation module specifically uses a formula $Q_g=Q_m'*(1-\eta_m)$ to calculate the gas mass flow rate $Q_g$, and uses a formula $Q_l=Q_m'*\eta_m$ to calculate the liquid mass flow rate $Q_l$.

It is further provided that a temperature sensor is provided within a casing of the Coriolis mass flowmeter, and the temperature sensor is attached to the measuring pipe of the Coriolis mass flowmeter.

The present application measures the total mass flow rate $Q_m$, the mixed density $\rho_{mix}$ and the medium temperature T through the Coriolis mass flowmeter; the combination of sensors measures the pressure difference ΔP at the inlet and the outlet, and in combination with the mixed density $\rho_{mix}$ to obtain the average pressure P in the measuring pipe of the Coriolis mass flowmeter through a computational fluid dynamics CFD model. The flow rate calculation module performs a multi-physical field coupling calculation, calculates pressure P corresponding to different positions X in a measuring pipe of the Coriolis mass flowmeter, and generates a function curve between the position and the pressure. The flow rate calculation module calculates an average pressure P in the measuring pipe of the Coriolis mass flowmeter through the function curve in combination with a calculus area solving mode; and calculates the average gas density $\rho_g$ by combining the average pressure P with the PVT equation; the flow rate calculation module calculates a mass liquid content $\eta_m$ of a mixed medium according to the mixed density $\rho_{mix}$, the average gas density $\rho_g$ and a liquid density $\rho_l$; corrects the total mass flow rate $Q_m$ according to the mass liquid content $\eta_m$ to obtain a total mass flow rate $Q_m'$; and finally, calculates a gas mass flow rate $Q_g$ and a liquid mass flow rate $Q_l$ according to the total mass flow rate $Q_m'$ and the mass liquid content $\eta_m$.

Data measurement is carried out through a single Coriolis mass flowmeter in combination with the multi-physical field coupling calculation, calculating to obtain accurate average pressure P, further correcting the gas density $\rho_g$, and calculating to obtain an accurate mass liquid content $\eta_m$ and the total mass flow rate $Q_m'$ conforming to the actual situation according to the gas density $\rho_g$, under the actual working condition, and finally calculating to obtain the gas-liquid two-phase flow rate. The data obtained by the wet gas flow rate metering method and device has higher accuracy.

DESCRIPTION OF THE EMBODIMENTS

The application is described in detail below with reference to the accompanying drawings and examples.

A wet gas flow rate metering method based on a Coriolis mass flowmeter includes the following specific metering methods:

A Coriolis mass flowmeter 1 measures a mass flow rate $Q_m$, a mixed density $\rho_{mix}$, a medium temperature T in a pipe.

Figure 1:
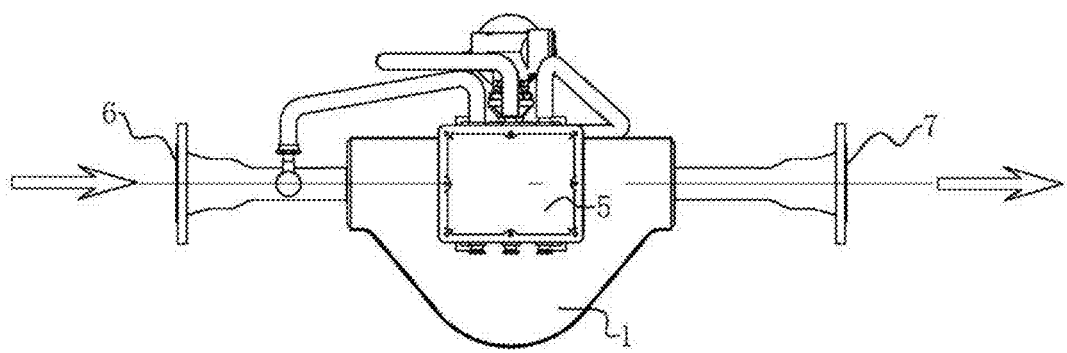
FIG. 1 is a front view of a wet gas flow rate metering device based on a Coriolis mass flowmeter of the present application (Embodiment 1 of a combination of sensors)
Figure 2:
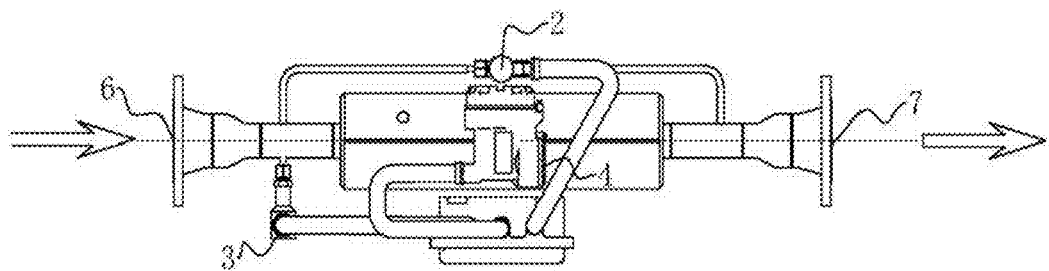
FIG. 2 is a top view of a wet gas flow rate metering device based on a Coriolis mass flowmeter of the present application (Embodiment 1 of a combination of sensors)

Referring to FIGS. 1 and 2, a combination of sensors includes a pressure sensor 3 and a differential pressure sensor 2 that by measuring the pressure at the inlet 6 of the Coriolis mass flowmeter 1 and measuring the differential pressure ΔP at the inlet 6 and the outlet 7 in combination with the mixed density $\rho_{mix}$, obtain the average pressure P in the measuring pipe of the Coriolis mass flowmeter through a computational fluid dynamics CFD model.

Figure 3:
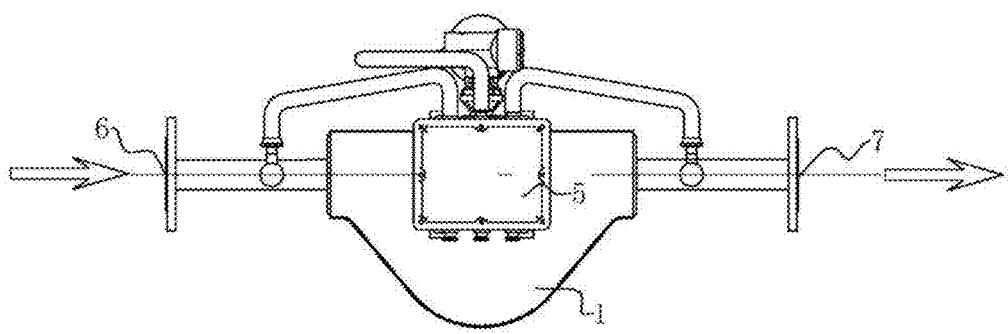
FIG. 3 is a front view of a wet gas flow rate metering device based on a Coriolis mass flowmeter of the present application (Embodiment 2 of the combination of sensors)
Figure 4:
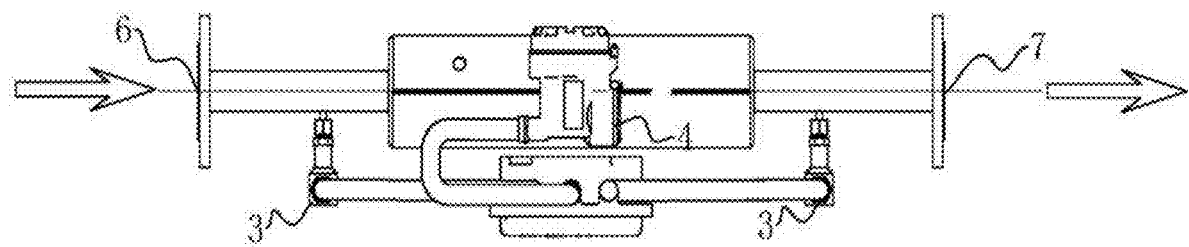
FIG. 4 is a top view of a wet gas flow rate metering device based on a Coriolis mass flowmeter of the present application (Embodiment 2 of the combination of sensors)

As shown in FIGS. 3 and 4, the combination of sensors also may include two pressure sensors 3 that by measuring the pressure at the inlet 6 and the outlet 7 of the Coriolis mass flowmeter 1 to obtain an actual differential pressure ΔP in combination with the mixed density $\rho_{mix}$, obtain the average pressure P in the measuring pipe of the Coriolis mass flowmeter through a computational fluid dynamics CFD model.

It should be noted that the above two sensor modes can achieve the purpose of measurement, and in the specific implementation process, the actual differential pressure ΔP can also be measured by other sensors in different combinations.

Figure 5:
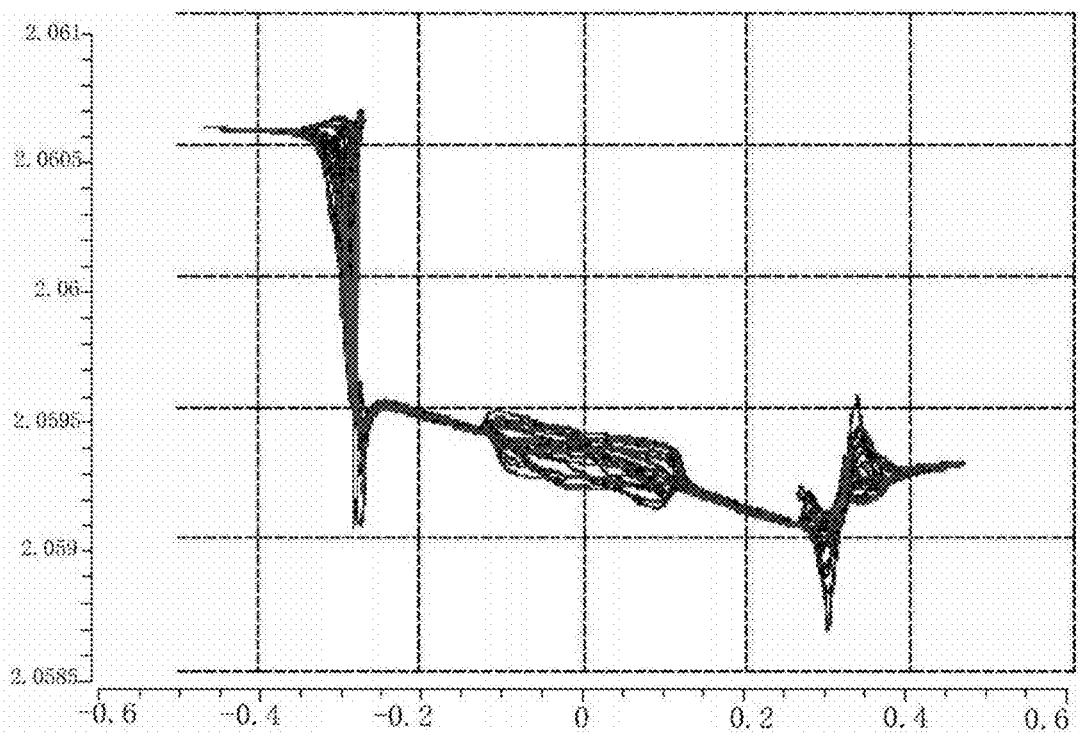
FIG. 5 is calculating the pressure P at the corresponding position according to different positions X in a measuring pipe of the Coriolis mass flowmeter, and generating a simulation function curve between the position and the pressure.
Figure 6:
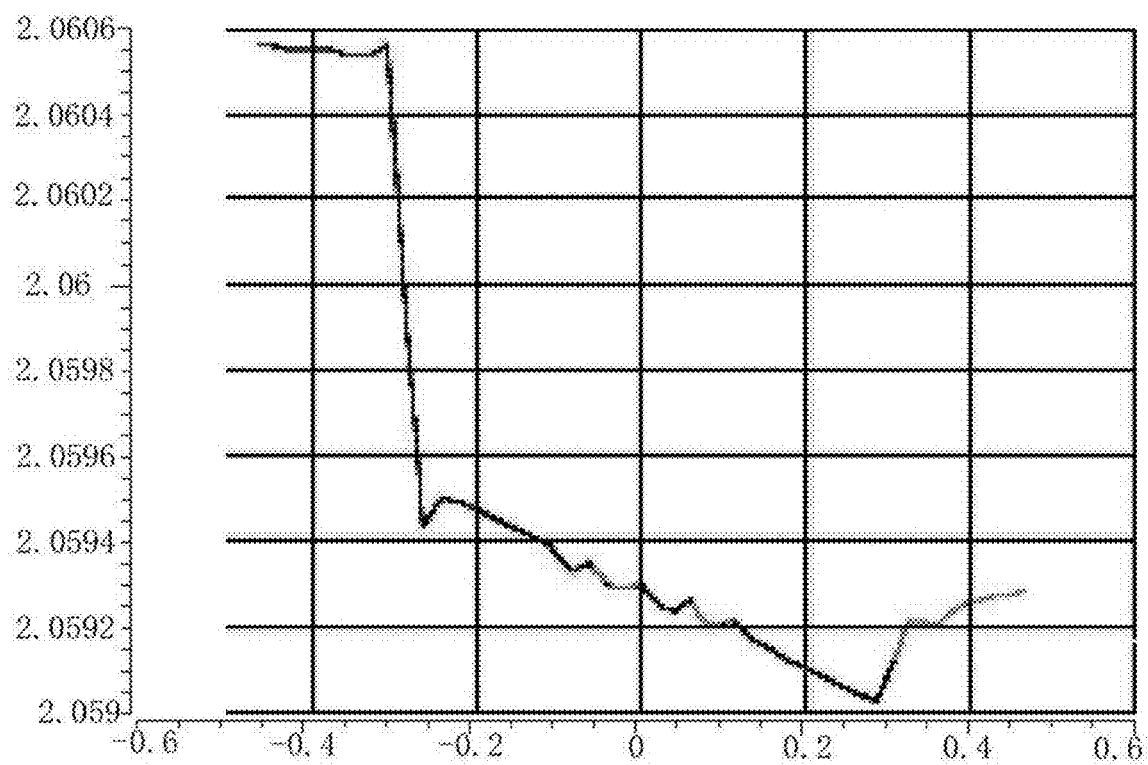
FIG. 6 is calculating the pressure P at the corresponding position according to different positions X in a measuring pipe of the Coriolis mass flowmeter, and generating a function curve between the position and the pressure.

The flow rate calculation module performs a multi-physical field coupling calculation, calculates pressure P corresponding to different positions X in a measuring pipe of the Coriolis mass flowmeter, and generates a function curve between the position and the pressure (see FIGS. 5 and 6 for details), the abscissa in FIGS. 5 and 6 corresponds to the different positions X in the measuring pipe of the Coriolis mass flowmeter, with the measuring unit of meter, the ordinate corresponds to the pressure P with the measuring unit of megapascal, and the average pressure P in the measuring pipe of the Coriolis mass flowmeter is calculated through the function curve.

The flow rate calculation module calculates the average pressure P in the measuring pipe of the Coriolis mass flowmeter by combining the function curve with a calculus area solving mode.

The flow rate calculation module combines the PVT equation of the gas-phase medium and the gas state equation according to the pressure P at different positions: PV=εnRT. It can be seen that the gas density $\rho_g$ is proportional to the pressure P and inversely proportional to the temperature T. It follows that the measurement of pressure and temperature is necessary and is a key quantity for obtaining the gas density, assuming that irrespective of the influence of the temperature field, when the pressure P varies, the volume V changes accordingly;

using the formula:

$$\frac{\rho_g}{\rho_0} = \frac{P}{P_0} * \frac{T_0}{T},$$

to finally obtain the average gas density $\rho_g$.

calculating the gas density $\rho_g$, where P, T are the pressure and the absolute temperature in the measuring pipe of the Coriolis mass flowmeter respectively, $\rho_0$, $P_0$ and $T_0$ are the gas density, the pressure and the absolute temperature in a calibration state respectively.

The flow rate calculation module calculates a mass liquid content $\eta_m$ of a mixed medium according to the mixed density $\rho_{mix}$, the average gas density $\rho_g$ and a liquid density $\rho_l$ by using the formula:

$$\eta_m = \frac{\rho_{mix} - \rho_g}{\rho_l - \rho_g} * \frac{\rho_l}{\rho_{mix}};$$

in the step that the flow rate calculation module corrects the total mass flow rate $Q_m$ according to the mass liquid content $\eta_m$, the average pressure P in the measuring pipe and the medium temperature T to obtain a total mass flow rate $Q_m'$, and the specific correction formula is that:

$$Q_m' = f(P, T, \eta_m, Q_m).$$

Figure 7:
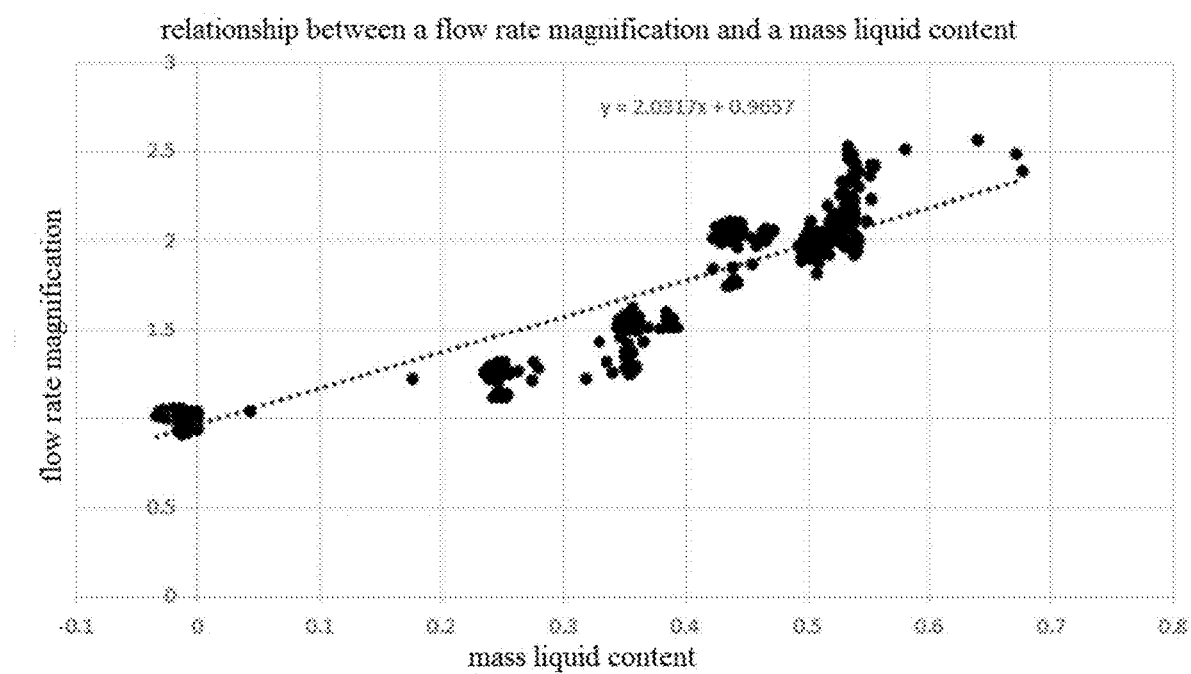
FIG. 7 is a function curve between a flow rate magnification and a mass liquid content.

In the actual calculation process, the data of a plurality of discrete point positions are measured through the flow rate calculation module, and an accurate calculation function is obtained through generating a function curve through the data of a plurality of groups of discrete point positions. Since the mass liquid content $\eta_m$ has a strong influence on the total mass flow rate $Q_m$ while the temperature T has a weak influence on the total mass flow rate $Q_m$, assuming that irrespective of the influence of the temperature T on the total mass flow rate $Q_m$, a function curve between the flow rate magnification and the mass liquid content is shown in FIG. 7 by the flow rate calculation module.

The flow rate calculation module calculates the corrected total mass flow rate $Q_m'$ through the function curve in combination with a curve equation.

the flow rate calculation module calculates a gas mass flow rate $Q_g$ and a liquid mass flow rate $Q_l$ according to the mass liquid content $\eta_m$ and the total mass flow rate $Q_m'$; uses a formula $Q_g = Q_m' * (1 - \eta_m)$ to calculate the gas mass flow rate $Q_g$; and uses a formula $Q_l = Q_m' * \eta_m$ to calculate the liquid mass flow rate $Q_l$.

According to the wet gas flow rate metering method provided by the embodiment of the application, the total mass flow rate $Q_m$, the mixed density $\rho_{mix}$ and the medium temperature T are measured through the Coriolis mass flowmeter; the combination of sensors measures the pressure difference ΔP at the inlet and the outlet, and in combination with the mixed density $\rho_{mix}$ to obtain the average pressure P in the measuring pipe of the Coriolis mass flowmeter through a computational fluid dynamics CFD model. The flow rate calculation module performs a multi-physical field coupling calculation, calculates pressure P corresponding to different positions X in a measuring pipe of the Coriolis mass flowmeter, and generates a function curve between the position and the pressure. The flow rate calculation module calculates an average pressure P in the measuring pipe of the Coriolis mass flowmeter through the function curve in combination with a calculus area solving mode; and calculates the average gas density $\rho_g$ by combining the average pressure P with the PVT equation; the flow rate calculation module calculates a mass liquid content $\eta_m$ of a mixed medium according to the mixed density $\rho_{mix}$, the average gas density $\rho_g$ and a liquid density $\rho_l$ which default is a constant; corrects the total mass flow rate $Q_m$ according to the mass liquid content $\eta_m$ of the mixed medium to obtain a corrected total mass flow rate $Q_m'$; and finally, calculates a gas mass flow rate $Q_g$ and a liquid mass flow rate $Q_l$ according to the total mass flow rate $Q_m'$ and the mass liquid content $\eta_m$.

Data measurement is carried out through a single Coriolis mass flowmeter in combination with the multi-physical field coupling calculation, calculating to obtain accurate average pressure P, further correcting the gas density $\rho_g$, and calculating to obtain an accurate mass liquid content $\eta_m$ and the total mass flow rate $Q_m'$ conforming to the actual situation according to the gas density $\rho_g$, under the actual working condition, and finally calculating to obtain the gas-liquid two-phase flow rate. The data obtained by the wet gas flow rate metering method and device has higher accuracy.

It is further noted here that the total mass flow rate $Q_m$ in this embodiment is directly measured and calculated by the Coriolis mass flowmeter, however, a person skilled in the art may also obtain the total mass flow rate $Q_m$ through other means. For example: a wet gas meter based on resonance and differential pressure measurements may be used. Firstly, a differential pressure $\Delta P$ between the inlet and the outlet of the measuring pipe is measured by a sensor, and using the formula: $Q_m = A\sqrt{\Delta P * \rho mix}$ to calculate and obtain the total mass flow rate $Q_m$, where A is a system parameter, $\Delta P$ is the differential pressure between the inlet and the outlet of the measuring pipe, and $\rho_{mix}$ is a mixed density of the medium.

After calculating and obtaining the total mass flow rate $Q_m$, the subsequent measuring and calculating of the data adopt the same correction mode as above.

With reference to FIGS. 1 and 2, a wet gas flow rate metering device based on a Coriolis mass flowmeter includes a Coriolis mass flowmeter 1, a pipe, a flow rate calculation module 5 and a combination of sensors that is mounted on the pipe. The flow rate calculation module 5 includes a processing unit 4, in which:

the pipe is for transferring the wet gas;

the combination of sensors is for measuring a differential pressure $\Delta P$ at the inlet 6 and the outlet 7 in the pipe;

the flow rate calculation module performs a multi-physical field coupling calculation, calculates pressure P corresponding to different positions X in a measuring pipe of the Coriolis mass flowmeter, and generates a function curve between the position and the pressure; the flow rate calculation module calculates an average pressure P in the measuring pipe of the Coriolis mass flowmeter through the function curve; calculates an average gas density $\rho_g$ according to the average pressure P; then calculates a mass liquid content $\eta_m$ of a mixed medium according to the mixed density $\rho_{mix}$, the average gas density $\rho_g$ and a liquid density $\rho_l$ (a constant); the flow rate calculation module corrects the total mass flow rate $Q_m$ according to the mass liquid content $\eta_m$, the average pressure P in the measuring pipe and the medium temperature T to obtain a total mass flow rate $Q_m'$; finally, the flow rate calculation module calculates a gas mass flow rate $Q_g$ and a liquid mass flow rate $Q_l$ according to the mass liquid content $\eta_m$ and the total mass flow rate $Q_m'$.

In some embodiments, as shown in FIGS. 1-2, the combination of sensors includes a pressure sensor 3 and a differential pressure sensor 2 that by measuring the pressure at the inlet 6 of the Coriolis mass flowmeter 1 and measuring the differential pressure $\Delta P$ at the inlet 6 and the outlet 7 in combination with the mixed density $\rho_{mix}$, obtain the average pressure P in the measuring pipe of the Coriolis mass flowmeter through a computational fluid dynamics CFD model.

In some embodiments, as shown in FIGS. 3 and 4, the combination of sensors also may include two pressure sensors 3 that by measuring the pressure at the inlet 6 and the outlet 7 of the Coriolis mass flowmeter 1 to obtain an actual differential pressure $\Delta P$ in combination with the mixed density $\rho_{mix}$, obtain the average pressure P in the measuring pipe of the Coriolis mass flowmeter through a computational fluid dynamics CFD model.

It should be noted that the above two sensor modes can achieve the purpose of measurement, and in the specific implementation process, the actual differential pressure $\Delta P$ can also be measured by other sensors in different combinations.

In some embodiments, the flow rate calculation module combines the PVT equation of the gas-phase medium and the gas state equation according to the pressure and temperature: $PV = \varepsilon nRT$. It can be seen that the gas density $\rho_g$ is proportional to the pressure P and inversely proportional to the temperature T. It follows that the measurement of pressure and temperature is necessary and is a key quantity for obtaining the gas density, assuming that irrespective of the influence of the temperature field, when the pressure P varies, the volume V changes accordingly; using the formula:

$$\frac{\rho_g}{\rho_0} = \frac{P}{P_0} * \frac{T_0}{T},$$

to finally obtain the average gas density $\rho_g$.

calculating the gas density $\rho_g$, where P, T are the pressure and the absolute temperature in the measuring pipe of the Coriolis mass flowmeter respectively, $\rho_0$, $P_0$ and $T_0$ are the gas density, the pressure and the absolute temperature in a calibration state respectively.

In some embodiments, the flow rate calculation module specifically uses a formula:

$$\eta_m = \frac{\rho_{mix} - \rho_g}{\rho_l - \rho_g} * \frac{\rho_l}{\rho_{mix}};$$

to calculate a mass liquid content $\eta_m$ of a mixed medium, where $\rho_{mix}$ is the mixed density, $\rho_g$ is the average gas density, and $\rho_l$ is a liquid density.

In some embodiments, in the step that the flow rate calculation module corrects the total mass flow rate $Q_m$ according to the mass liquid content $\eta_m$, the average pressure P in the measuring pipe and the medium temperature T to obtain a total mass flow rate $Q_m'$, and the specific correction formula is that:

$$Q_m' = f(P, T, \eta_m, Q_m);$$

In the actual calculation process, the data of a plurality of discrete point positions are measured through the flow rate calculation module, and an accurate calculation function is obtained through generating a function curve through the data of a plurality of groups of discrete point positions. Since the mass liquid content $\eta_m$ has a strong influence on the total mass flow rate $Q_m$ while the temperature T has a weak influence on the total mass flow rate $Q_m$, assuming that irrespective of the influence of the temperature T on the total mass flow rate $Q_m$, a function curve between the flow rate magnification and the mass liquid content is shown in FIG. 7 by the flow rate calculation module.

The flow rate calculation module calculates the corrected total mass flow rate $Q_m'$ through the function curve in combination with a curve equation.

In some embodiments, the flow rate calculation module specifically uses a formula $Q_g = Q_m' * (1 - \eta_m)$ to calculate the gas mass flow rate $Q_g$; and uses a formula $Q_l = Q_m' * \eta_m$ to calculate the liquid mass flow rate $Q_l$.

In some embodiments, a temperature sensor is provided within a casing of the Coriolis mass flowmeter, and the temperature sensor is attached to the measuring pipe of the Coriolis mass flowmeter. The temperature sensor synchronously vibrates with the measuring pipe, so that the temperature of the medium can be accurately reflected.

According to the wet gas flow rate metering device provided by the embodiment of the application, the total mass flow rate $Q_m$, the mixed density $\rho_{mix}$ and the medium temperature T are measured through the Coriolis mass flowmeter; the combination of sensors measures the pressure difference $\Delta P$ at the inlet and the outlet, and in combination with the mixed density $\rho_{mix}$ to obtain the average pressure P in the measuring pipe of the Coriolis mass flowmeter through a computational fluid dynamics CFD model. The flow rate calculation module performs a multi-physical field coupling calculation, calculates pressure P corresponding to different positions X in a measuring pipe of the Coriolis mass flowmeter, and generates a function curve between the position and the pressure. The flow rate calculation module calculates an average pressure P in the measuring pipe of the Coriolis mass flowmeter through the function curve in combination with a calculus area solving mode; and calculates the average gas density $\rho_g$ by combining the average pressure P with the PVT equation; the flow rate calculation module calculates a mass liquid content $\eta_m$ of a mixed medium according to the mixed density $\rho_{mix}$, the average gas density $\rho_g$ and a liquid density $\rho_l$ which default is a constant; corrects the total mass flow rate $Q_m$ according to the mass liquid content $\eta_m$ of the mixed medium to obtain a corrected total mass flow rate $Q_m'$; and finally, calculates a gas mass flow rate $Q_g$ and a liquid mass flow rate $Q_l$ according to the total mass flow rate $Q_m'$ and the mass liquid content $\eta_m$.

Data measurement is carried out through a single Coriolis mass flowmeter in combination with the multi-physical field coupling calculation, calculating to obtain accurate average pressure P, further correcting the gas density $\rho_g$, and calculating to obtain an accurate mass liquid content $\eta_m$ and the total mass flow rate $Q_m'$ conforming to the actual situation according to the gas density $\rho_g$, under the actual working condition, and finally calculating to obtain the gas-liquid two-phase flow rate. The data obtained by the wet gas flow rate metering method and device has higher accuracy.

A series of experiments are carried out by using the wet gas flow rate metering device, which shows the influence of the mass liquid content $\eta_m$ on the total mass flow rate $Q_m$. See FIG. 8. The higher the mass liquid content $\eta_m$ in the context of the wet gas, the greater the influence on the total mass flow rate measurement valve measured by the Coriolis mass flowmeter. The influence is substantially a linear relationship.

Figures 8, 9:
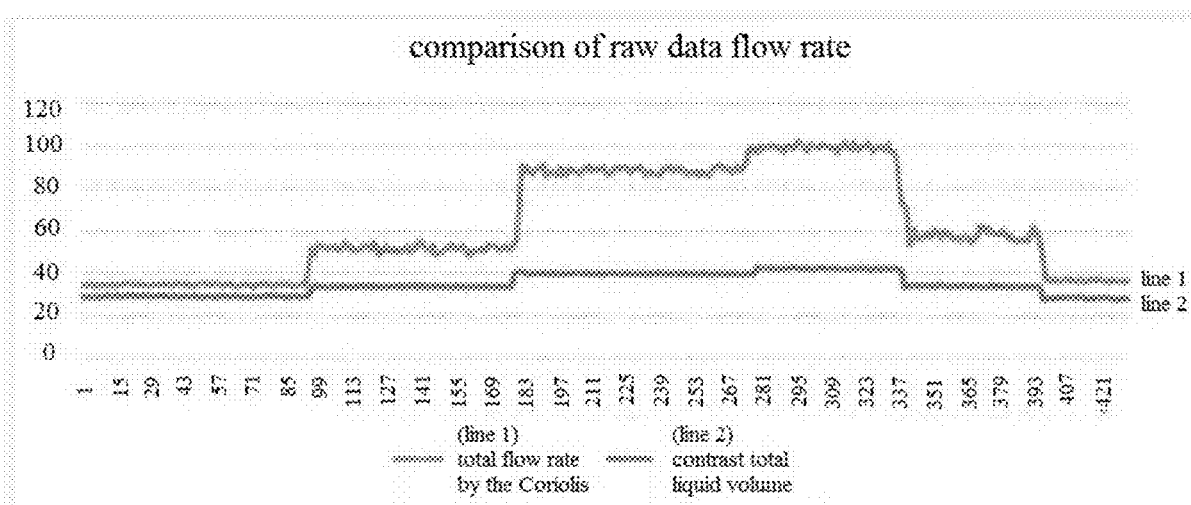
FIG. 8 is a comparison table of flow rate data in a standard condition and before and after correction.
FIG. 9 is a comparison chart of raw data flow rate.
Figure 10:
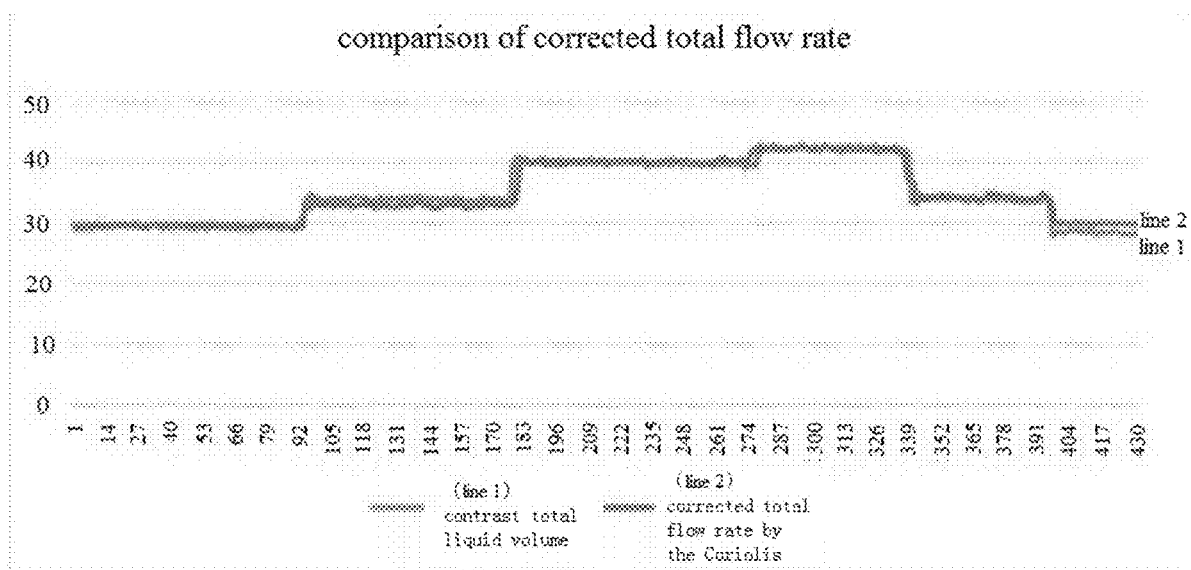
FIG. 10 is a comparison chart of the total flow rate after correction.
Figure 11:
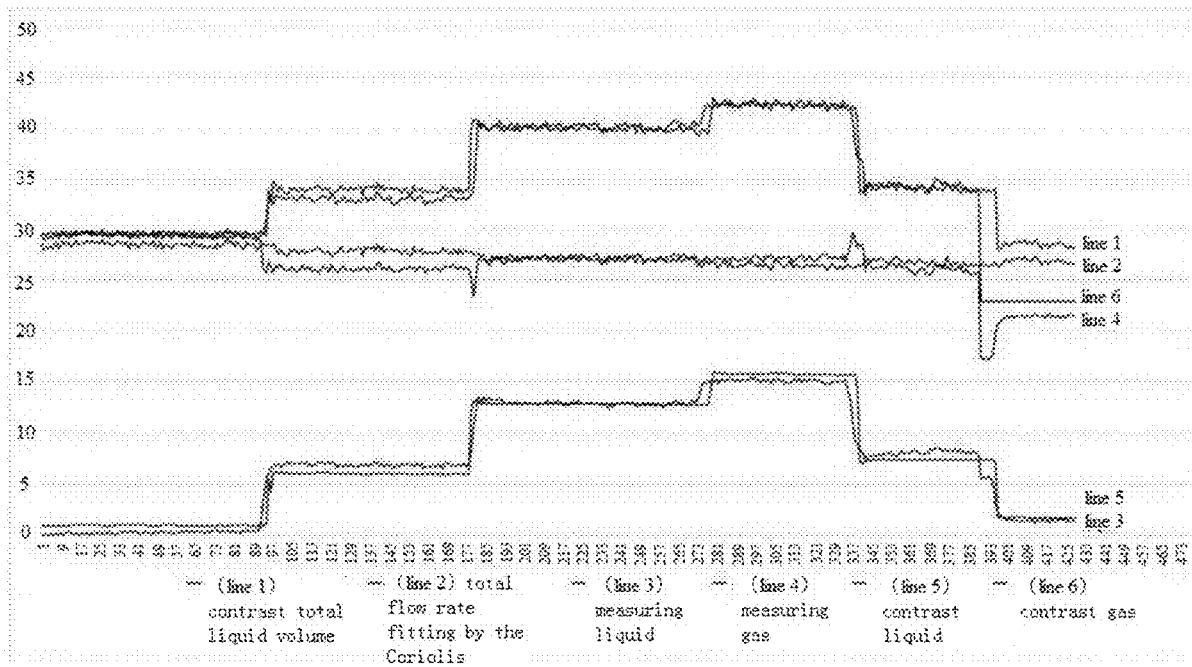
FIG. 11 is a comparison chart of measurement results.

To further prove the data measurement accuracy of the wet gas metering device of the present embodiment, FIGS. 9, 10 and 11 are comparisons of flow rate data before and after correction.

According to the experimental data, the data which is not corrected has larger difference with the actual working condition data, while the difference between the corrected data and the actual working condition data is smaller. It can be seen that the effectiveness of multi-physic filed coupling correction.

The above descriptions are only preferred embodiments of the present application, and the protection scope of the present application is not limited to the above embodiments, and all technical solutions belonging to the idea of the present application belong to the protection scope of the present application. It should be noted that modifications and embellishments within the scope of the application may occur to those skilled in the art without departing from the principle of the application, and are considered to be within the scope of the application.

What is claimed is:

1. A wet gas flow rate metering method based on a Coriolis mass flowmeter, comprising the steps of:
   measuring, by the Coriolis mass flowmeter, a mass flow rate $Q_m$, a mixed density $\rho_{mix}$, and a medium temperature T in a pipe;
   measuring, by a combination of sensors, a pressure at an inlet and an outlet of the Coriolis mass flowmeter;
   performing, by a flow rate calculation module, a multi-physical field coupling calculation, calculating a plurality of pressures corresponding to different positions X in a measuring pipe of the Coriolis mass flowmeter, and generating a function curve between each of the different positions and a corresponding one of the plurality of pressures;
   calculating, by the flow rate calculation module, an average pressure in the measuring pipe of the Coriolis mass flowmeter through the function curve;
   calculating, by the flow rate calculation module, an average gas density $\rho_g$ according to the average pressure;
   calculating, by the flow rate calculation module, a mass liquid content $\eta_m$ of a mixed medium according to the mixed density $\rho_{mix}$, the average gas density $\rho_g$ and a liquid density $\rho_l$, specifically comprising using a formula:

$$\eta_m = \frac{\rho_{mix} - \rho_g}{\rho_l - \rho_g} * \frac{\rho_l}{\rho_{mix}};$$

correcting, by the flow rate calculation module, the mass flow rate $Q_m$ according to the mass liquid content $\eta_m$, the average pressure in the measuring pipe and the medium temperature T to obtain a total mass flow rate $Q_m'$; and
   calculating, by the flow rate calculation module, a gas mass flow rate $Q_g$ and a liquid mass flow rate $Q_l$ according to the mass liquid content $\eta_m$ and the total mass flow rate $Q_m'$.

2. The wet gas flow rate metering method based on the Coriolis mass flowmeter according to claim 1, wherein the combination of sensors comprises a pressure sensor and a differential pressure sensor that by measuring the pressure at the inlet of the Coriolis mass flowmeter and measuring a differential pressure $\Delta P$ at the inlet and the outlet in combination with the mixed density $\rho_{mix}$, obtain the average pressure in the measuring pipe of the Coriolis mass flowmeter through a computational fluid dynamics (CFD) model.

3. The wet gas flow rate metering method based on the Coriolis mass flowmeter according to claim 1, wherein the combination of sensors comprises two pressure sensors that by measuring the pressure at the inlet and the outlet of the Coriolis mass flowmeter to obtain an actual differential pressure $\Delta P$ in combination with the mixed density $\rho_{mix}$, obtain the average pressure in the measuring pipe of the Coriolis mass flowmeter through a computational fluid dynamics (CFD) model.

4. The wet gas flow rate metering method based on the Coriolis mass flowmeter according to claim 1, wherein the step of calculating, by the flow rate calculation module, an average pressure in the measuring pipe of the Coriolis mass flowmeter through the function curve comprises:
   calculating by using a calculus area solving to obtain the average pressure.

5. The wet gas flow rate metering method based on the Coriolis mass flowmeter according to claim 4, wherein the step of calculating, by the flow rate calculation module, an average gas density $\rho_g$ according to the average pressure comprises:
using the average pressure and the medium temperature T in combination with a pressure-volume-temperate (PVT) equation of a gas phase medium, using a formula:

$$\frac{\rho_g}{\rho_0} = \frac{P}{P_0} * \frac{T_0}{T},$$

to finally obtain the average gas density $\rho_g$;
wherein P and T are the average pressure and an absolute temperature in the measuring pipe of the Coriolis mass flowmeter respectively, $\rho_0$, $P_0$ and $T_0$ area a gas density, a pressure and an absolute temperature in a calibration state respectively.

6. The wet gas flow rate metering method based on the Coriolis mass flowmeter according to claim 5, wherein in the step of correcting, by the flow rate calculation module, the mass flow rate $Q_m$ according to the mass liquid content $\eta_m$, the average pressure in the measuring pipe and the medium temperature T to obtain a total mass flow rate $Q_m'$, a specific correction formula is $Q_m'=f(P,T,\eta_m,Q_m)$.

7. The wet gas flow rate metering method based on the Coriolis mass flowmeter according to claim 6, wherein the step of calculating, by the flow rate calculation module a gas mass flow rate $Q_g$ and a liquid mass flow rate $Q_l$ according to the mass liquid content $\eta_m$ and the total mass flow rate $Q_m'$ comprises:
using a formula $Q_g=Q_m'*(1-\eta_m)$ to calculate the gas mass flow rate $Q_g$; and
using a formula $Q_l=Q_m'*\eta_m$ to calculate the liquid mass flow rate $Q_l$.

8. A wet gas flow rate metering device based on a Coriolis mass flowmeter, comprising the Coriolis mass flowmeter, and further comprising a pipe, a flow rate calculation module and a combination of sensors that is mounted on the pipe, wherein:
the pipe is for transferring wet gas;
the combination of sensors is for measuring a differential pressure ΔP at an inlet and an outlet in the pipe;
the flow rate calculation module performs a multi-physical field coupling calculation, calculates a plurality of pressures respectively corresponding to different positions X in a measuring pipe of the Coriolis mass flowmeter, and generates a function curve between each of the different positions and a corresponding one of the plurality of pressures; the flow rate calculation module calculates an average pressure in the measuring pipe of the Coriolis mass flowmeter through the function curve; calculates an average gas density $\rho_g$ according to the average pressure; then calculates a mass liquid content $\eta_m$ of a mixed medium according to a mixed density $\rho_{mix}$, the average gas density $\rho_g$ and a liquid density $\rho_l$, wherein the liquid density $\rho_l$ is a constant, specifically comprising:
using a formula:

$$\eta_m = \frac{\rho_{mix} - \rho_g}{\rho_l - \rho_g} * \frac{\rho_l}{\rho_{mix}};$$

the flow rate calculation module corrects a mass flow rate $Q_m$ according to the mass liquid content $\eta_m$, the average pressure in the measuring pipe and a medium temperature T to obtain a total mass flow rate $Q_m'$; finally, the flow rate calculation module calculates a gas mass flow rate $Q_g$ and a liquid mass flow rate $Q_l$ according to the mass liquid content $\eta_m$ and the total mass flow rate $Q_m'$.

9. The wet gas flow rate metering device based on a Coriolis mass flowmeter according to claim 8, wherein the combination of sensors comprises a pressure sensor and a differential pressure sensor that by measuring a pressure at the inlet of the Coriolis mass flowmeter and measuring the differential pressure ΔP at the inlet and the outlet in combination with the mixed density $\rho_{mix}$, obtain the average pressure in the measuring pipe of the Coriolis mass flowmeter through a computational fluid dynamics (CFD) model.

10. The wet gas flow rate metering device based on the Coriolis mass flowmeter according to claim 8, wherein the combination of sensors comprises two pressure sensors that by measuring a pressure at the inlet and the outlet of the Coriolis mass flowmeter to obtain an actual differential pressure ΔP in combination with the mixed density $\rho_{mix}$, obtain the average pressure in the measuring pipe of the Coriolis mass flowmeter through a computational fluid dynamics (CFD) model.

11. The wet gas flow rate metering device based on the Coriolis mass flowmeter according to claim 8, wherein calculating, by the flow rate calculation module the average pressure in the measuring pipe of the Coriolis mass flowmeter through the function curve comprises: calculating by using a calculus area solving to obtain the average pressure.

12. The wet gas flow rate metering device based on the Coriolis mass flowmeter according to claim 11, wherein the flow rate calculation module, according to the average pressure and the medium temperature T in combination with a pressure-volume-temperate (PVT) equation of a gas phase medium, uses a formula:
$\rho_g/\rho_0=P/P_0*T_0/T$ to finally obtain the average gas density $\rho_g$;
wherein P and T are the average pressure and an absolute temperature in the measuring pipe of the Coriolis mass flowmeter respectively, $\rho_0$, $P_0$ and $T_0$ are a gas density, a pressure and an absolute temperature in a calibration state respectively.

13. The wet gas flow rate metering device based on the Coriolis mass flowmeter according to claim 12, wherein when the flow rate calculation module corrects the mass flow rate $Q_m$ according to the mass liquid content $\eta_m$, the average pressure in the measuring pipe and the medium temperature T to obtain the total mass flow rate $Q_m'$, a specific correction formula is that $Q_m'=f(P,T,\eta_m,Q_m)$.

14. The wet gas flow rate metering device based on the Coriolis mass flowmeter according to claim 13, wherein the flow rate calculation module specifically uses a formula $Q_g=Q_m'*(1-\eta_m)$ to calculate the gas mass flow rate $Q_g$, and uses a formula $Q_l=Q_m'*\eta_m$ to calculate the liquid mass flow rate $Q_l$.

15. The wet gas flow rate metering device based on the Coriolis mass flowmeter according to claim 8, wherein a temperature sensor is provided within a casing of the Coriolis mass flowmeter, and the temperature sensor is attached to the measuring pipe of the Coriolis mass flowmeter.

* * * * *